(12) United States Patent
Shi et al.

(10) Patent No.: US 11,625,320 B2
(45) Date of Patent: Apr. 11, 2023

(54) TENSOR-BASED OPTIMIZATION METHOD FOR MEMORY MANAGEMENT OF A DEEP-LEARNING GPU AND SYSTEM THEREOF

(71) Applicant: Huazhong University of Science and Technology, Hubei (CN)

(72) Inventors: Xuanhua Shi, Hubei (CN); Xuan Peng, Hubei (CN); Hai Jin, Hubei (CN); Hulin Dai, Hubei (CN); Weiliang Ma, Hubei (CN); Qian Xiong, Hubei (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 539 days.

(21) Appl. No.: 16/946,690

(22) Filed: Jul. 1, 2020

(65) Prior Publication Data
US 2021/0142178 A1 May 13, 2021

(51) Int. Cl.
*G06F 12/02* (2006.01)
*G06F 12/0806* (2016.01)
*G06N 5/046* (2023.01)
*G06T 1/60* (2006.01)

(52) U.S. Cl.
CPC ........ *G06F 12/023* (2013.01); *G06F 12/0806* (2013.01); *G06N 5/046* (2013.01); *G06T 1/60* (2013.01)

(58) Field of Classification Search
CPC .... G06F 12/023; G06F 12/0806; G06F 12/08; G06F 9/5016; G06N 5/046; G06T 1/60
See application file for complete search history.

(56) References Cited

U.S. PATENT DOCUMENTS

2005/0231504 A1* 10/2005 Heng ...................... G06T 15/40
345/582

* cited by examiner

*Primary Examiner* — Jae U Yu
(74) *Attorney, Agent, or Firm* — Michael X. Ye; Rimon Law (57) ABSTRACT

The present disclosure relates to a tensor-based optimization method for GPU memory management of deep learning, at least comprising steps of: executing at least one computing operation, which gets tensors as input and generates tensors as output; when one said computing operation is executed, tracking access information of the tensors, and setting up a memory management optimization decision based on the access information, during a first iteration of training, performing memory swapping operations passively between a CPU memory and a GPU memory so as to obtain the access information about the tensors regarding a complete iteration; according to the obtained access information about the tensors regarding the complete iteration, setting up a memory management optimization decision; and in a successive iteration, dynamically adjusting the set optimization decision of memory management according to operational feedbacks.

15 Claims, 6 Drawing Sheets

TENSOR-BASED OPTIMIZATION METHOD FOR MEMORY MANAGEMENT OF A DEEP-LEARNING GPU AND SYSTEM THEREOF

This application claims the benefit of China Patent Application No. 201911105147.6, filed on Nov. 12, 2019, which is incorporated by reference herein in its entirety.

BACKGROUND OF THE INVENTION

1. Technical Field

The present invention relates to optimization of deep learning systems, and more particularly to a tensor-based optimization method for management of GPU memory in deep learning and a system thereof.

2. Description of Related Art

Deep neural networks have huge demands on computation and memory. With the great computation capacity provided by various emerging heterogeneous hardware (such as TPUs, ASICs and GPUs), deep neural networks have become prevailing, and GPUs are currently the most popular option of training equipment. Training the increasingly deep and wide neural networks is a big challenge to memories of GPUs. For example, the latest BERT has 768 hidden layers, and consumes 73 GB during training (with a batch size of 64). However, high-bandwidth GPU memories are scarce resources for the fact that the memory size of the latest Nvidia GPU V100 is only 32 GB and prevailing GPUs (e.g. P100) used in commercial clouds only have 16 GB memory. This forms limitations to flexibility of deep neural networks of various structures.

For addressing this issue, there are mainly two approaches to reducing memory occupation, namely memory swapping and re-computing. These two approaches both involve releasing memory occupied by characteristic mapping in forward propagation and then re-generating characteristic mapping during backward propagation. Specifically, memory swapping uses the CPU DRAM as an additional, external memory when performing back-and-forth asynchronous data replication between the GPU and the CPU, while re-computing involves re-computing operation of forward propagation in the process of backward propagation so as to obtain the required characteristic mapping. None of these approaches have impact on training precision. For example, China Patent Publication No. CN109919310A discloses a GPU memory optimization method and system oriented to deep learning training tasks. The known method comprises: (1) designing a basic swapping-in operation; (2) performing static data collection before training; (3) without using a swapping-in/swapping-out strategy, first training plural epochs while performing dynamic data collection; (4) developing a performance model for the swapping-in/swapping-out strategy and identifying conditioning among GPU computation, memory and PCIe communication; (5) according to the performance model establishing an optimal strategy; and (6) training the remaining epochs with an optimal minibatch size and a matching swapping-in/swapping-out strategy until the end. The prior-art method overcomes the challenges about training of very deep neural network models and about low training efficiency in training minibatches of very small sizes, and make full use of GPU resources to improve training efficiency for very deep neural network models.

To be short, the prior-art method is based on static analysis of computing graph and executes layered GPU memory management according to characteristics of different neural network layers. Such a static analysis however raises three issues. First, hardware heterogeneity and variations in input sizes make it difficult to predict the computation time for different layers. Even for layers of the same type, the computation time varies significantly. Therefore, statically determining the goal of memory optimization based on the type of layers will limit the potential of memory optimization. Second, a decision based on "qualitative" information roughly obtained is irrelevant to quantify the overhead of a certain memory operation, and therefore is not helpful to sequence priority levels of an optimizable memory and select between memory swapping and re-computing. Third, the development of deep neural networks is quick and ongoing, from convolutional neural networks and recurrent neural networks to transformers and graph neural networks, and even user-defined operations are sometimes involved. For neural networks of new types, the prior knowledge doesn't work. In addition, for deep learning frameworks that do not perform graph computing before execution, such as PyTorch and the eager mode of Tensorflow, memory management based on computation graph does not work under such an imperative programming mode. Hence, the object of the present invention is to provide an optimization method for management of GPU memory in deep learning that overcomes the foregoing shortcomings.

Since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with the related art more existing technical features as support according to relevant regulations.

SUMMARY OF THE INVENTION

As used herein, the term "module" refers to any hardware, software or software-hardware combination that can execute functions related to the "module."

In view of the shortcomings of the prior art, the present invention provides a tensor-based optimization method for GPU memory management of deep learning, comprises the following steps: executing at least one computing operation, which gets tensors as input and generates tensors as output; when one said computing operation is executed, tracking access information of the tensors, and setting up a memory management optimization decision based on the access information; during a first iteration of training, performing memory swapping operations passively between a CPU memory and the GPU memory so as to obtain the access information about the tensors regarding a complete iteration; according to the obtained access information about the tensors regarding the complete iteration, setting up a memory management optimization decision; and in a successive iteration, dynamically adjusting the set optimization decision of memory management according to operational feedbacks.

As compared to the disclosure of CN109919310A, the present invention at least has the following distinctive technical features: A. during a first iteration of training, performing memory swapping operations passively between a CPU memory and the GPU memory so as to obtain the access information about the tensors regarding one complete iteration; B. according to the obtained access information about the tensors regarding the complete iteration, setting up a memory management optimization decision; and C. during a successive iteration, according to operational feedbacks dynamically adjusting the set memory management optimization decision.

The technical issue the present invention is trying to address is: how to leverage the potential of memory optimization. The technical effects achieved by the present invention are: dynamically tracking the tensor access information during operation, thereby effectively sensing memory overload information and performance overheads caused by the respective use of memory swapping and re-computing. This way better method can be chosen to optimize memory of a tensor, thereby reducing performance overhead required by training for deep learning.

The technical issue of the prior art to be addressed is to improve the training efficiency of superneural network models and the technical effect provided by the prior art is making full use of GPU resources to enhance training efficiency of superneural network models. It is thus obvious that the present invention is distinct from the prior art in terms of technical issues addressed, technical schemes adopted, and technical effects achieved.

Additionally, the present invention has the following beneficial technical effects:

(1) The present invention realizes deep learning GPU memory management based on tensors. Since tensors are popular and general data abstract for deep learning, and all computing operations are based on tensors, the present invention is more fine-grained and flexible than layer-based memory management, and can fully discover space for memory optimization, thereby facilitating training for larger and deeper neural networks.

(2) The memory optimization method for a deep learning GPU of the present invention only requires information collection patches before and after computation of the deep learning framework, so the number of codes to be modified is small, which is easy to use. Furthermore, the deep learning frameworks for code programming and imperative programming have shared tensor access characteristics, so the method used in the system of the present invention is applicable to all deep learning frameworks.

DETAILED DESCRIPTION OF THE INVENTION

The following description is to be read with reference to the accompanying drawings.

For clarity, some technical terms used in this document are defined as below:

Tensor: tensors are abstract of vectors, matrixes or data of higher dimensions in deep learning. Basically, the existing deep learning systems use tensors as data abstract, and all computing operations take tensors as their inputs and generate tensors as their outputs.

Passive swapping of tensors: in the event of failed distribution of the GPU memory, some tensors are moved to the CPU memory, and when these tensors are accessed again, they are passively swapped into the GPU memory.

Embodiment 1

Figure 1:
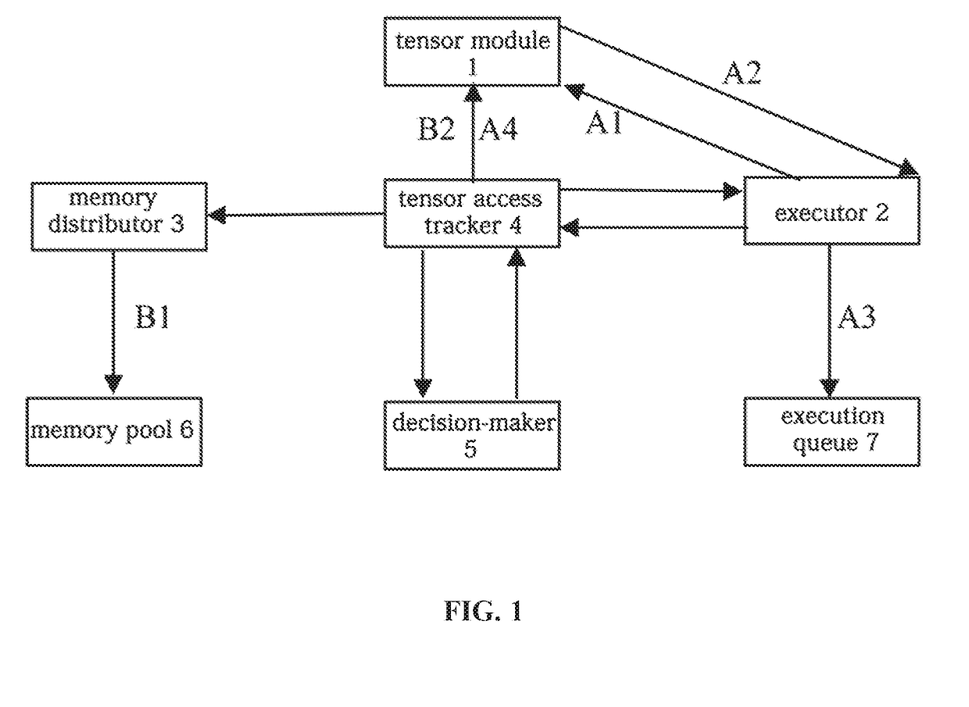
FIG. 1 is a schematic modular diagram of a preferred optimization system for GPU memory management of deep learning according to the present invention.

As shown in FIG. 1, the present invention provides a tensor-based optimization system for GPU memory management of deep learning, which at least comprises a tensor module 1, an executor 2, a memory distributor 3, a tensor access tracker 4, a decision-maker 5 and a memory pool 6. The tensor module 1, the executor 2, the memory distributor 3 and the decision-maker 5 are all coupled to the tensor access tracker 4. The memory pool 6 is configured to be coupled to the memory distributor 3. The tensor module 1 stores tensors. Tensors are abstract of vectors, matrixes or data of higher dimensions in deep learning. The existing deep learning systems typically use tensors as data abstract, and all their computing operations use tensors as inputs while generating tensors as outputs. Every element in a tensor has the same and known data type. For example, in the present invention, the data type of tensors may be of the integer type or the floating-point type. The executor 2 may be an atomic processing unit that processes computation. It takes kernels (computing kernel function) and vectors of tensors as input, and generates vectors of tensors as output. The memory distributor 3 for the GPU may be memory distribution interface and memory release interface that packs the bottom layer, such as cudaMalloc for NVIDIA GPUs and cudaFree for NVIDIA GPUs. Thereby, it can provide modules at upper layers with dynamic memory distribution and release so as to save the overhead of physically distributing and releasing the memory. To state differently, when the reference count of a tensor comes to 0, the memory distributor 3 automatically recovers the bottom layer memory corresponding to that tensor. The tensor access tracker 4 can track access information of tensors. For example, the tensor access tracker 4 can insert a tensor access log function before and after execution of an operation, so as to track access information of tensors. The decision-maker 5 can set up a memory management optimization decision according to access information of tensors. For example, the memory optimization management strategy comprises a first control command, a second control command and a third control command. The first control command and the second control command can be transferred to the memory distributor 3 through the tensor access tracker 4. Therein, the memory distributor 3 can execute the memory swapping operation based on the first control command or the second control command. Specifically, the memory swapping operation comprises a swapping-out operation and a swapping-in operation. The swapping-out operation refers to that the memory pool 6, according to control command issued by the memory distributor, moves the corresponding tensors to the CPU memory, so as to recover the bottom-layer GPU memory corresponding to the tensors. The swapping-in operation refers to that the memory pool 6, according to the control instructions issued by the memory distributor, moves the corresponding tensors to the GPU memory form the CPU memory for execution. The first control command is configured to trigger the memory distributor 3 to execute the swapping-out operation. The second control command is configured to trigger the memory distributor 3 to execute the swapping-in operation. The third control command can be transmitted to the executor 2 through the tensor access tracker 4. The executor 2 can respond to the third control command and execute the re-computing operation. The re-computing operation refers to recalculating the operation in forward propagation during backward propagation so as to obtain the required characteristic mapping.

Preferably, as shown in FIG. 1, the executor 2 executes the re-computing operation through the following steps:

A1: Executing a fill lineage operation (filling lineage);

Specifically, the fill lineage operation involves filling the tensor lineage, which describes from which tensors and through which operation the tensor is figured out. This is to ensure that the operation having to be re-executed during re-computing can be identified according to the lineage when re-computing is required.

A2: where the tensor access tracker 4 transmits the third control command to the executor 2, the executor 2 acquires re-computing operation from the tensor module 1 (getting re-computing ops);

Specifically, acquiring the operation of re-computing involves backward traversing tensor lineage from the current tensor, until the latest available tensor is found thereby calculating the tensor. The operations in the path started from the latest available tensor to the current tensor lineage are the tensor re-computing operations of the tensors. This is to figure out the tensor with the minimal possible overhead.

A3: the executor 2 adds re-computing to an execution queue 7 of the GPU;

A4: executing a filling memory address operation (filling addr);

Specifically, the filling memory address operation involves filling the memory address of data of the tensor bottom layer. A tensor will apply for a new memory footprint in the GPU memory pool during swapping-in and re-computing, and the memory address is used to fill this field of the memory address of the tensor. This is to ensure that when the tensor is accessed again data is read from the correct memory address.

Preferably, as shown in FIG. 1, the memory distributor 3 executes the swapping-out operation or swapping-in operation through the following steps:

B1: where the first control command is transmitted to memory distributor 3 through the tensor access tracker 4, the memory distributor 3 executes the swapping-out operation, or where the second control command is transmitted to the memory distributor 3 through the tensor access tracker 4, the memory distributor 3 executes the swapping-in operation;

B2: executing a filling memory address operation;

Specifically, the filling memory address operation involves filling the memory address of data of the tensor bottom layer. A tensor will apply for a new memory footprint in the GPU memory pool during swapping-in and re-computing, and the memory address is used to fill this field of the memory address of the tensor. This is to ensure that when the tensor is accessed again data is read from the correct memory address.

Preferably, the disclosed optimization system for GPU memory management of deep learning executes a computing operation through the following steps: logging the access information of all the tensors in an input tensor vector, and storing the access information into the tensor access information table; determining whether the tensor access is going to trigger memory swapping or re-computing, and if yes, the memory distributor 3 executes the memory swapping operation or the executor 2 executes the re-computing operation; adding the computing operation to a GPU execution queue; initializing an access number of all the tensors in an output tensor vector to zero, and storing all the access information corresponding thereto to the access information table.

Preferably, the executor 2 can execute at least one computing operation. The tensor access tracker 4 can track access information of the tensors when one said computing operation is executed. The decision-maker 5 can set up optimization decision for memory management based on the access information. The decision-maker 5 is configured to: during a first iteration of training, passively performing memory swapping so as to obtain the access information about the tensors regarding a complete iteration; according to the obtained access information about the tensors regarding the complete iteration, setting up a memory management optimization decision; and during a successive iteration, according to operational feedbacks dynamically adjusting the set memory management optimization decision.

Preferably, the memory distributor 3 is able to execute the memory swapping operation when the tensor access is determined as being going to trigger memory swap. The executor 2 is further configured to: where it is determined that the tensor access will trigger re-computing, execute the re-computing operation; and adding the computing operation to a GPU execution queue.

Preferably, training for deep learning includes forward computation and backward computation, and includes multiple iterations, thus giving the present invention an opportunity of memory optimization. The present invention is applicable to training for all deep learning algorithms, such as deep neural networks like ResNet-50 and BERT. Training for a deep neural network uses the backward propagation algorithm. Therein, updating of parameters for the neural network may adopt algorithms like stochastic gradient descent and Adam, for example.

Embodiment 2

The present embodiment provides further improvements to Embodiment 1, and what is identical to its counterpart in the previous embodiment will not be repeated in the following description.

Figure 2:
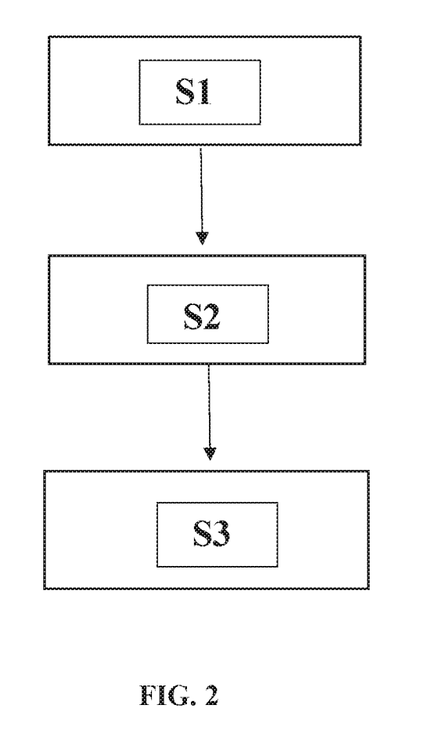
FIG. 2 is a flowchart of a preferable optimization method for GPU memory management of deep learning according to the present invention.

As shown in FIG. 2, the present invention further provides a tensor-based optimization method for GPU memory management of deep learning, which comprises the following steps:

S1: during a first iteration of training, performing memory swapping operations passively between a CPU memory and the GPU memory so as to obtain the access information about the tensors regarding a complete iteration.

Specifically, it at least comprises the following steps:

S10: developing a tensor access information table, so that every time when the tensors are accessed, the access information of the tensors is stored into the tensor access information table.

Specifically, the tensor accessed during computation can all be stored in the tensor module 1, and the tensors can be accessed and called by the executor 2 as its input. The tensor access information table may be preloaded into the tensor module 1, and every time a tensor is accessed, the access information of the tensors is stored into the tensor access information table. Information contained in the access information table of tensors includes id, count and timestamp. Table 1 shows an example of such a table. Therein, id represents the exclusive name of a given tensor, and can be used to differentiate one tensor from another. For example, an id may contain one of a serial number 1, 2 . . . n for identification. A count represents the frequency a given tensor getting accessed in one iteration. When a tensor is generated, the count is set to an initial value, such as zero, for example, and every single time it is accessed, the corresponding count value is increased by 1. A timestamp represents the time when a given tensor is accessed latest, and every time the tensor is accessed, the timestamp is updated correspondingly.

TABLE 1

| id | count | timestamp |
| --- | --- | --- |

S11: when OOM happens, finding one or more tensors from the beginning of the tensor access information table, passively swapping out the GPU memory until this OOM disappears, and logging the CPU memory address corresponding to this swap.

Specifically, when OOM happens, based on a temporal order of the tensors being accessed, sieving out one or more said tensors from the tensor access information table successively, so that when the one or more tensors are passively swapped out of the GPU memory and enter the CPU memory, OOM is eliminated, wherein CPU memory addresses corresponding to the one or more passively swapped tensors form a log. OOM refers to that memory is fully occupied and memory application fails. Finding one or more tensors from the tensor access information table refers to starting selection from the tensors accessed first according to the access timestamp.

S12: when an access error happens to tensor, determining the corresponding CPU memory address, and passively swapping it into the GPU memory.

Specifically, a tensor access error refers to that the tensor has been swapped to the CPU because of OOM and thus cannot be found in the GPU at the time the GPU is accessed again. The tensor module 1 may be regarded as a description to the data at the bottom layer, such as the physical address of the shape, the data of the tensor on the GPU and so on. The module is stored in the CPU memory by nature because it does not keep any actual data of the tensors. The memory pool 6 includes a CPU memory pool and a GPU memory pool, and swapping-in/swapping-out is performed between the GPU memory and the CPU memory according to the operation type.

S13: when one said iteration ends, subtracting time for all said passive memory swapping operations performed previously from a timestamp of the access information of the tensors so as to obtain the access information about the tensors regarding a complete said iteration.

Figure 5:
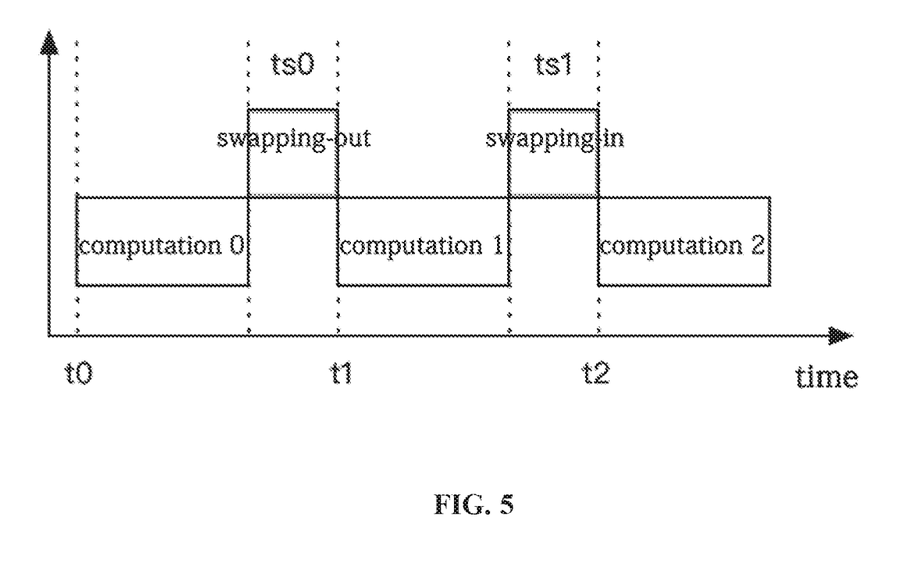
FIG. 5 is a graph illustrating a preferred process of obtaining access information of tensors regarding complete iteration according to the present invention.

Specifically, as shown in FIG. 5, assuming that Computation 0 needs access to Tensor A, Computation 1 needs access to Tensor B, and Computation 2 needs access to Tensor C, they are accessed at Timestamps t0, t1 and t2, respectively, during passive memory swapping. At this time, ts0 is subtracted from t1 to get the timestamp at which Tensor B is accessed. (t2-ts0-ts1) is taken as the timestamp at which Tensor C is accessed. It is understandable that we can assume that there is an infinite GPU memory space for accommodating the tensor access timestamp information during operation.

S2: according to the obtained access information about the tensors regarding the complete iteration, setting up a memory management optimization decision.

Specifically, setting up a memory management optimization decision comprises the following steps:

S20: according to the determined access information of the tensors, obtaining plural candidate tensors for memory optimization.

Specifically, the candidate tensors are tensors accessed at least twice and located in the peak memory. As training progresses, the use of GPU memory increases gradually to a peak and stays there for a period of time before decreasing gradually. With the description of "in the peak memory", it refers to the tensors being in the time period corresponding to the peak value.

S21: acquiring free time of the candidate tensors (FreeTime), where the candidate tensors are sorted in a descending order based on the free time, selecting a trigger tensor access of memory swapping-in for the candidate tensor that has the greatest free time, and calculating a first overhead required by a memory swapping operation and a second overhead required by a re-computing operation, respectively, and where the first overhead is smaller than the second overhead, configuring the memory swapping operation for the candidate tensor, or where the first overhead is greater than the second overhead, configuring the re-computing operation for the candidate tensor.

Specifically, the trigger tensor access refers to a specific tensor access (identified using tensor id and its access count, such as the second access to Tensor A). The purpose is to trigger swap out/swap in or re-computing for a certain tensor during that tensor access. The first overhead is calculated according to free time of the tensor. When the free time is greater than 0, the first overhead is 0. When the free time is smaller than 0, the first overhead is the absolute value of the free time. The second overhead is calculated by identifying all operations having to be executed for re-computing and summing up the execution time of all the operations together. In other words, it is equal to the sum of all execution time.

S22: according to the selected candidate tensor that has the greatest free time, updating the free time of the remaining candidate tensors.

Specifically, the free time of the tensor is calculated through the following steps. The first step is to determine the timestamps at which the tensor has to be swapped out and swapped in, respectively. For example, according to the access information table of the tensor, the two access time with the largest intervals are the timestamps at which the tensor has to be swapped out and swapped in. The second step is to calculate the swap time (SwapTime) required by the tensor according to the memory size occupied by the tensor and the PCI-e bandwidth from the GPU to the CPU. For example, SwapTime may be determined using the equation $$SwapTime = \frac{T_{mem}}{B_{pcie}},$$

where $T_{mem}$ is the memory size occupied by the tensor, and $B_{pcie}$ is the PCI-e bandwidth between the GPU and the CPU. The third step is to calculate the end time of the swapping out process of the tensor (SwapOutEndTime), which is equal to the sum of the timestamp of the swapping out process of the tensor and SwapTime. The fourth step is to calculate the start time when the tensor has to be swapped in at latest (SwapinStartTime), which is equal to the difference between the timestamp at which the tensor has to be swapped in and SwapTime of the tensor. The fifth step is to determine the FreeTime of the tensor using the equation FreeTime=SwapinStartTime−SwapOutEndTime. In a given iteration, the frequency a tensor is accessed is constant, and the timestamp with respect to the time when the iteration starts to be accessed is basically consistent. Thus, setting up a memory management optimization decision for the tensor access mode of one iteration can be well applied to the successive iterations.

S23: repeating Steps S21 and S22, until the selected candidate tensor has a size that satisfies the requirement for memory footprint reduction.

Specifically, this is about when OOM happens, finding one or more tensors from the beginning of the tensor access information table, passively swapping out the GPU memory until this OOM disappears. In the foregoing process, if the sum of all the tensors that are passively swapped out is the requirement for memory footprint reduction, it means that the candidate tensor has a size that satisfies the requirement for memory footprint reduction.

Figure 6:
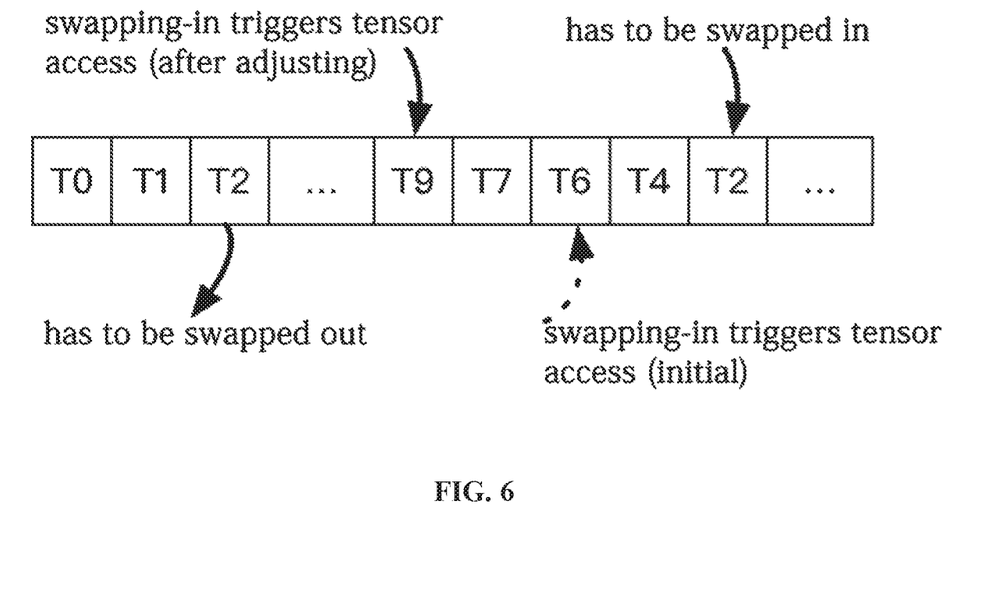
FIG. 6 is a diagram illustrating a preferred process of forward adjusting the trigger tensor access of memory swapping-in of the tensor according to the present invention.

S3: during a successive iteration, according to operational feedbacks dynamically adjusting the memory management optimization decision;

Specifically, dynamically adjusting the memory management optimization decision comprises the following steps:

S30: when any of the tensors is accessed, checking a state of the tensor, wherein while the tensor is being swapped into the GPU memory, the trigger tensor access for memory swapping-in of the tensor is forward adjusted, and the adjusted trigger tensor access is marked as active at the successive iteration;

Specifically, as shown in FIG. 6, T2 has to be swapped out when it is accessed for the first time, so is has to be timely swapped into the GPU memory when it is accessed for the second time. The trigger tensor access for its initial memory swapping in is the first access at T6 (assuming that T6 is only accessed for once, as indicated by the dotted line). At this time, the state of the tensor is checked when T2 is accessed for the second time. If it is found as being swapped in the GPU memory (not being swapped in timely), its trigger tensor access is adjusted from the first access at T6 to the first access at T9 (assuming that T9 is only accessed for once, too). The adjustment is performed holding to the principle that: the search is begun with the initial trigger tensor access and moves forward until the interval between the timestamp of a tensor access and the timestamp of the initial trigger tensor access is greater than SwapTime of T2×5%.

S31: where the tensor is not being swapped in the GPU memory, not adjusting the swap in trigger tensor access of the tensor.

Specifically, the tensor is being swapped into the GPU memory, meaning that the tensor is not swapped in timely.

Embodiment 3

The present embodiment provides further improvements to the preceding embodiments, and what is identical to its counterpart in the previous embodiment will not be repeated in the following description.

Figure 3:
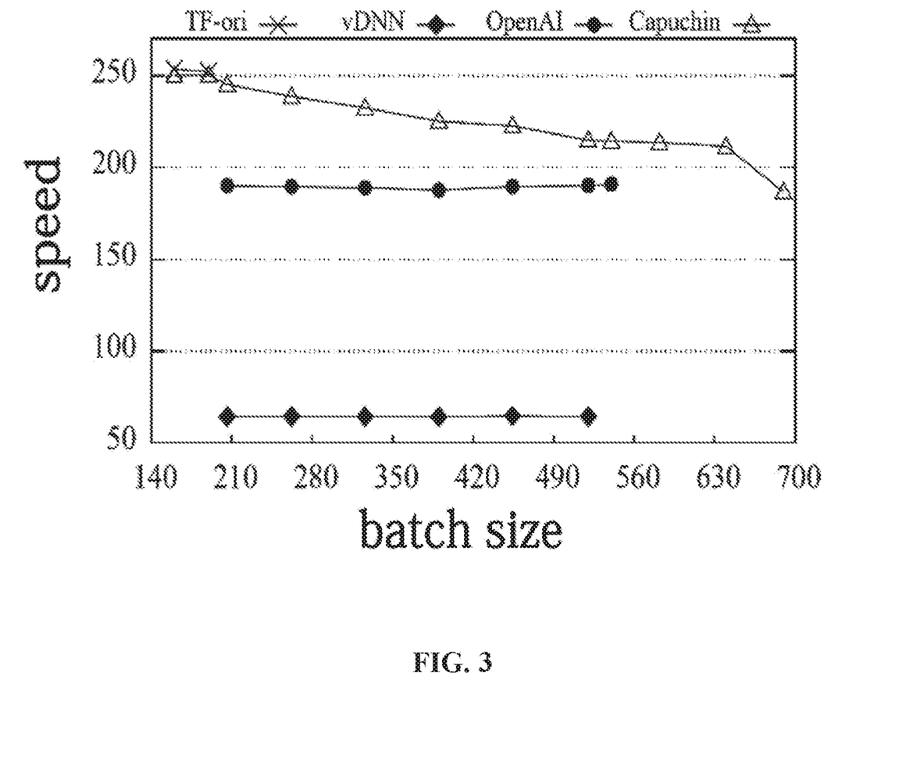
FIG. 3 is a graph showing experimental results of the present invention under a preferred symbolic programming mode.
Figure 4:
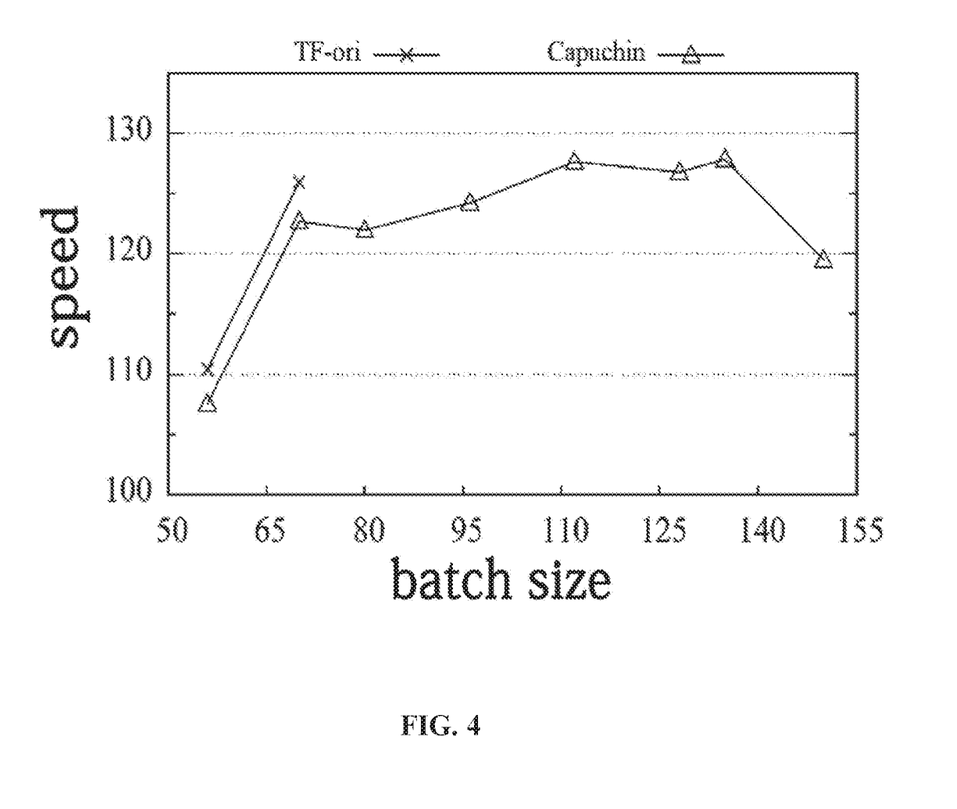
FIG. 4 is a graph showing experimental results of the present invention under a preferred imperative programming mode.

FIG. 3 and FIG. 4 are made according to a confirmatory experiment performed on the optimization method for management of GPU memory in deep learning of the present invention. Specifically, for the confirmatory experiment, a Nvidia P100 GPU was implemented. The CPU used is Intel Xeon E5-2680 v4, with a CPU memory of 256 GB, and PCI-e is 3.0×16. The system operated Ubuntu 16.04, CUDA Toolkit Ver. 9.0, cuDNN Ver. 7.3.1, and Tensorflow Ver. 1.11, while Capuchin (equipped with the optimization method for management of GPU memory in deep learning of the present invention) was of the same version.

Experiments were conducted in the symbolic programming mode and the imperative programming mode of Tensorflow, respectively. FIG. 3 shows comparison between re-computing results achieved by the original Tensorflow and by the existing working vDNN and OpenAI. From the training speed of the original Tensorflow it is found that the additional overhead caused by the present invention for logging access information of tensors during operation is very small, not exceeding 1%. In terms of memory footprint reduction, the maximum batch size achievable by the present invention is 5.34 times of Tensorflow itself, and is 1.88 times of the larger one between vDNN and OpenAI. As to performance loss, vDNN performed least well, only 70.0%. This is because of the static analysis of the vDNN, and due to the powerful computation of P100, the computation time was short, thus failing to well cover the overhead of memory swapping. As compared to vDNN and OpenAI, a Capuchin designed according to the present invention was able to effectively sense how overloaded the memory was and the performance overhead caused by memory swapping and re-computing. Thus, Capuchin provided 3.86× and 1.32× performance enhancement as compared to vDNN and OpenAI, respectively, and the improvements were 3.61 times and 1.23 times in average.

Preferably, as shown in FIG. 4, since there was no existing work that could optimize the GPU memory under the imperative programming mode, comparison was only made with the original Tensorflow. Under this mode, the additional overhead brought about by Capuchin designed according to the present invention is slightly greater than that under the computation graph mode. This is because in the imperative mode, an operation can only start after the previous operation has been completed. Therefore, logging the operation of applying for the lock and releasing the lock during tensor accesses could lead to stagnation of computation, but since the overall overhead was about 2%, this is still acceptable. Capuchin increased the maximum batch size for 171% as compared to the original Tensorflow. As to performance, Capuchin showed performance enhancement as the batch size increased. This is because for the neural network DenseNet, its computation volume was not sufficient to saturate the computation resources of P100. Thus, when Capuchin increased the batch size it could achieve, P100 GPU could still accommodate more computation volume, and the required computation time did not increase linearly, so the eventual performance improved on the contrary.

Embodiment 4

The present embodiment provides further improvements to the preceding embodiments, and what is identical to its counterpart in the previous embodiment will not be repeated in the following description.

Preferably, the present invention further provides a computer-readable storage medium. The computer-readable storage medium stores computer programs. The computer program when executed can implement the technical schemes described with respect to the preceding embodiments. Since the principles for implementation are alike, repeated description is omitted herein. The computer-readable storage medium may be any tangible medium that can store data and can be read using computing devices.

Preferably, the present invention further provides an electronic device, which comprises: one or more processors and memories. The memories store executable instructions. The one or more processors are configured to implement the technical schemes described with respect to the preceding embodiments through executable instructions. Since the principles for implementation are alike, repeated description is omitted herein.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A tensor-based optimization method for graphics processing unit (GPU) memory management of deep learning, comprising the steps of:
    executing at least one computing operation, wherein the at least one computing operation receives tensors as input and generates tensors as output;
    when the at least one computing operation is executed, tracking access information of the input tensors and output tensors, and setting up a memory management optimization decision based on the access information, the method being characterized in:
    during a first iteration of training, performing memory swapping operations passively between a central processing unit (CPU) memory and a GPU memory so as to obtain the access information about the input tensors and output tensors regarding a complete iteration;
    according to the obtained access information about the input tensors and output tensors regarding the complete iteration, setting up a memory management optimization decision; and
    in a successive iteration, dynamically adjusting the optimization decision of memory management according to operational feedbacks; and
    wherein the step of obtaining access information about the input tensors and output tensors regarding a complete iteration comprises steps of:
    constructing at least one tensor access information table, so that every time when one of the input tensors and output tensors are accessed, the access information of the one of the input tensors and output tensors is stored into the at least one tensor access information table;
    when out-of-memory (OOM) occurs, based on a temporal order of timestamps when the one of the input tensors and output tensors are accessed, sieving out one or more of the input tensors and output tensors from the at least one tensor access information table successively, so that when the one or more input tensors and output tensors are passively swapped out of the GPU memory and enter the CPU memory, OOM is eliminated, wherein CPU memory addresses corresponding to the one or more passively swapped input tensors and output tensors form a log;
    when an access error happens to one of the input tensors and output tensor, determining the CPU memory address corresponding to the one of the input tensors and output tensor based on the log, and passively swapping the one of the input tensors and output tensor into the GPU memory; and
    when one said iteration ends, subtracting time for all said passive memory swapping operations performed previously from a timestamp of the access information of the one of the input tensors and output tensors so as to obtain the access information about the one of the input tensors and output tensors regarding a complete iteration.

2. The optimization method of claim 1, wherein the step of setting up the memory management optimization decision further comprises the steps of:
    according to the determined access information of the input tensors and output tensors, obtaining plural candidate tensors for memory optimization;
    acquiring idle time of the candidate tensors;
    selecting a trigger tensor access of memory swapping-in for the candidate tensor that has the greatest idle time;
    calculating a first overhead required by a memory swapping operation and a second overhead required by a re-computing operation, respectively, and where the first overhead is smaller than the second overhead, configuring the memory swapping operation for the candidate tensor, or where the first overhead is larger than second overhead, configuring the re-computing operation for the candidate tensor;
    according to the selected candidate tensor that has the greatest idle time, updating the idle time of the remaining candidate tensors; and
    repeating the previous steps, until the selected candidate tensor has a size that satisfies predetermined requirements of memory footprint reduction.

3. The optimization method of claim 2, wherein the step of dynamically adjusting the memory management optimization decision comprises steps of:
    when any of the input tensors or output tensors is accessed, checking the state of the accessed tensor, wherein while the input tensors or output tensor is being swapped into the GPU memory, the trigger tensor access for memory swapping-in of the input tensor or output tensor is adjusted forward, and is configured to be active at the successive iteration.

4. The optimization method of claim 3, wherein the step of acquiring the idle time of the candidate tensors comprises steps of:
    identifying the timestamps at which the input tensors or output tensors are swapped out of the GPU memory and the timestamps at which the input tensors or output tensors are swapped into the GPU memory;
    determining a swap time required by the input tensor or output tensor based on an equation $$SwapTime = \frac{T_{mem}}{B_{pcie}},$$

where $T_{mem}$ is a memory footprint of the tensor and $B_{pcie}$ is a PCI-e bandwidth between the GPU and the CPU;

based on a sum of a timestamp at which the input tensor or output tensor is swapped out of the GPU memory and the swap time, determining an end time when the input tensor or output tensor is swapped out of the GPU memory;

based on a difference between a timestamp at which the input tensor or output tensor is swapped in the GPU memory and the swap time, determining a start time when the input tensor or output tensor has to be swapped into the GPU memory at latest; and based on a difference between the start time and the end time, determining the idle time.

5. The optimization method of claim 4, wherein the step of executing the computing operation comprises steps of:

logging the access information of all the input tensor or output tensors in an input tensor vector, and storing the access information to the tensor access information table;

where it is determined that the tensor access will trigger memory swapping, executing the memory swapping operation, or where it is determined that the tensor access will trigger re-computing, executing the re-computing operation;

adding the computing operation to a GPU execution queue; and initializing an access frequency of all the input tensors or output tensors in an output tensor vector, and storing all the access information corresponding thereto to the tensor access information table.

6. A computer-readable storage medium, which stores a computer program that, when executed, performs the optimization method for management of GPU memory in deep learning of:

executing at least one computing operation, wherein the at least one computing operation receives tensors as input and generates tensors as output;

when the at least one computing operation is executed, tracking access information of the input tensors and output tensors, and setting up a memory management optimization decision based on the access information, the method being characterized in:

during a first iteration of training, performing memory swapping operations passively between a central processing unit (CPU) memory and a GPU memory so as to obtain the access information about the input tensors and output tensors regarding a complete iteration;

according to the obtained access information about the input tensors and output tensors regarding the complete iteration, setting up a memory management optimization decision; and in a successive iteration, dynamically adjusting the set optimization decision of memory management according to operational feedbacks; and wherein the step of obtaining access information about the input tensors and output tensors regarding a complete iteration comprises steps of:

constructing at least one tensor access information table, so that every time when one of the input tensors and output tensors are accessed, the access information of the one of the input tensors and output tensors is stored into the at least one tensor access information table;

when out-of-memory (OOM) occurs, based on a temporal order of timestamps when the one of the input tensors and output tensors are accessed, sieving out one or more of the input tensors and output tensors from the at least one tensor access information table successively, so that when the one or more input tensors and output tensors are passively swapped out of the GPU memory and enter the CPU memory, OOM is eliminated, wherein CPU memory addresses corresponding to the one or more passively swapped input tensors and output tensors form a log;

when an access error happens to one of the input tensors and output tensor, determining the CPU memory address corresponding to the one of the input tensors and output tensor based on the log, and passively swapping the one of the input tensors and output tensor into the GPU memory; and when one said iteration ends, subtracting time for all said passive memory swapping operations performed previously from a timestamp of the access information of the one of the input tensors and output tensors so as to obtain the access information about the one of the input tensors and output tensors regarding a complete iteration.

7. The computer-readable storage medium of claim 6, wherein the step of setting up the memory management optimization decision further comprises the steps of:

according to the determined access information of the input tensors and output tensors, obtaining plural candidate tensors for memory optimization;

acquiring idle time of the candidate tensors;

selecting a trigger tensor access of memory swapping-in for the candidate tensor that has the greatest idle time;

calculating a first overhead required by a memory swapping operation and a second overhead required by a re-computing operation, respectively, and where the first overhead is smaller than the second overhead, configuring the memory swapping operation for the candidate tensor, or where the first overhead is larger than second overhead, configuring the re-computing operation for the candidate tensor;

according to the selected candidate tensor that has the greatest idle time, updating the idle time of the remaining candidate tensors; and repeating the previous steps, until the selected candidate tensor has a size that satisfies predetermined requirements of memory footprint reduction.

8. The computer-readable storage medium of claim 7, wherein the step of dynamically adjusting the memory management optimization decision comprises steps of:

when any of the input tensors or output tensors is accessed, checking a state of the accessed tensor, wherein while the input tensors or output tensor is being swapped into the GPU memory, the trigger tensor access for memory swapping-in of the input tensor or output tensor is adjusted forward, and is configured to be active at the successive iteration.

9. The computer-readable storage medium of claim 8, wherein the step of acquiring the idle time of the candidate tensors comprises steps of:

identifying the timestamps at which the input tensors or output tensors are swapped out of the GPU memory and the timestamps at which the input tensors or output tensors are swapped into the GPU memory;

determining a swap time required by the input tensor or output tensor based on an equation $$SwapTime = \frac{T_{mem}}{B_{pcie}},$$

where $T_{mem}$ is a memory footprint of the tensor and $B_{pcie}$ is a PCI-e bandwidth between the GPU and the CPU;

based on a sum of a timestamp at which the input tensor or output tensor is swapped out of the GPU memory and the swap time, determining an end time when the input tensor or output tensor is swapped out of the GPU memory;

based on a difference between a timestamp at which the input tensor or output tensor is swapped in the GPU memory and the swap time, determining a start time when the input tensor or output tensor has to be swapped into the GPU memory at latest; and based on a difference between the start time and the end time, determining the idle time.

10. The computer-readable storage medium of claim 9, wherein the step of executing the computing operation comprises steps of:

logging the access information of all the input tensor or output tensors in an input tensor vector, and storing the access information to the tensor access information table;

where it is determined that the tensor access will trigger memory swapping, executing the memory swapping operation, or where it is determined that the tensor access will trigger re-computing, executing the re-computing operation;

adding the computing operation to a GPU execution queue; and initializing an access frequency of all the input tensors or output tensors in an output tensor vector, and storing all the access information corresponding thereto to the tensor access information table.

11. An electronic device, comprising:
one or more processor; and
a memory, for storing executable instructions;
wherein the one or more processor is configured to realize the optimization method for management of GPU memory in deep learning comprising the steps of:
executing at least one computing operation, wherein the at least one computing operation receives tensors as input and generates tensors as output;
when the at least one computing operation is executed, tracking access information of the input tensors and output tensors, and setting up a memory management optimization decision based on the access information, the method being characterized in:
during a first iteration of training, performing memory swapping operations passively between a central processing unit (CPU) memory and a GPU memory so as to obtain the access information about the input tensors and output tensors regarding a complete iteration;
according to the obtained access information about the input tensors and output tensors regarding the complete iteration, setting up a memory management optimization decision; and
in a successive iteration, dynamically adjusting the set optimization decision of memory management according to operational feedbacks; and wherein the step of obtaining access information about the input tensors and output tensors regarding a complete iteration comprises steps of:

constructing at least one tensor access information table, so that every time when one of the input tensors and output tensors are accessed, the access information of the one of the input tensors and output tensors is stored into the at least one tensor access information table;

when out-of-memory (OOM) occurs, based on a temporal order of timestamps when the one of the input tensors and output tensors are accessed, sieving out one or more of the input tensors and output tensors from the at least one tensor access information table successively, so that when the one or more input tensors and output tensors are passively swapped out of the GPU memory and enter the CPU memory, OOM is eliminated, wherein CPU memory addresses corresponding to the one or more passively swapped input tensors and output tensors form a log;

when an access error happens to one of the input tensors and output tensor, determining the CPU memory address corresponding to the one of the input tensors and output tensor based on the log, and passively swapping the one of the input tensors and output tensor into the GPU memory; and when one said iteration ends, subtracting time for all said passive memory swapping operations performed previously from a timestamp of the access information of the one of the input tensors and output tensors so as to obtain the access information about the one of the input tensors and output tensors regarding a complete iteration.

12. The electronic device of claim 11, wherein the step of setting up the memory management optimization decision further comprises the steps of:

according to the determined access information of the input tensors and output tensors, obtaining plural candidate tensors for memory optimization;

acquiring idle time of the candidate tensors;

selecting a trigger tensor access of memory swapping-in for the candidate tensor that has the greatest idle time;

calculating a first overhead required by a memory swapping operation and a second overhead required by a re-computing operation, respectively, and where the first overhead is smaller than the second overhead, configuring the memory swapping operation for the candidate tensor, or where the first overhead is larger than second overhead, configuring the re-computing operation for the candidate tensor;

according to the selected candidate tensor that has the greatest idle time, updating the idle time of the remaining candidate tensors; and repeating the previous steps, until the selected candidate tensor has a size that satisfies predetermined requirements of memory footprint reduction.

13. The optimization method of claim 12, wherein the step of dynamically adjusting the memory management optimization decision comprises steps of:

when any of the input tensors or output tensors is accessed, checking a state of the accessed tensor, wherein while the input tensors or output tensor is being swapped into the GPU memory, the trigger tensor access for memory swapping-in of the input tensor or output tensor is adjusted forward, and is configured to be active at the successive iteration.

14. The optimization method of claim 13, wherein the step of acquiring the idle time of the candidate tensors comprises steps of:
- identifying the timestamps at which the input tensors or output tensors are swapped out of the GPU memory and the timestamps at which the input tensors or output tensors are swapped into the GPU memory;
- determining a swap time required by the input tensor or output tensor based on an equation $$SwapTime = \frac{T_{mem}}{B_{pcie}},$$

where $T_{mem}$ is a memory footprint of the tensor and $B_{pcie}$ is a PCI-e bandwidth between the GPU and the CPU;
- based on a sum of a timestamp at which the input tensor or output tensor is swapped out of the GPU memory and the swap time, determining an end time when the input tensor or output tensor is swapped out of the GPU memory;
- based on a difference between a timestamp at which the input tensor or output tensor is swapped in the GPU memory and the swap time, determining a start time when the input tensor or output tensor has to be swapped into the GPU memory at latest; and
- based on a difference between the start time and the end time, determining the idle time.

15. The optimization method of claim 14, wherein the step of executing the computing operation comprises steps of:
- logging the access information of all the input tensor or output tensors in an input tensor vector, and storing the access information to the tensor access information table;
- where it is determined that the tensor access will trigger memory swapping, executing the memory swapping operation, or where it is determined that the tensor access will trigger re-computing, executing the re-computing operation;
- adding the computing operation to a GPU execution queue; and
- initializing an access frequency of all the input tensors or output tensors in an output tensor vector, and storing all the access information corresponding thereto to the tensor access information table.

* * * * *